United States Patent
Laroia et al.

(10) Patent No.: US 8,693,305 B2
(45) Date of Patent: Apr. 8, 2014

(54) METHOD AND APPARATUS FOR DETECTING OFDM SIGNALS IN THE PRESENCE OF FREQUENCY ORTHOGONAL OFDM INTERFERERS

(75) Inventors: Rajiv Laroia, San Diego, CA (US); Ashwin Sampath, San Diego, CA (US); Raja Sekhar Bachu, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 384 days.

(21) Appl. No.: 12/860,617

(22) Filed: Aug. 20, 2010

(65) Prior Publication Data
US 2011/0045776 A1 Feb. 24, 2011

Related U.S. Application Data

(60) Provisional application No. 61/236,495, filed on Aug. 24, 2009.

(51) Int. Cl.
*H04J 11/00* (2006.01)
*H04L 1/00* (2006.01)
*H04L 15/00* (2006.01)

(52) U.S. Cl.
USPC ............................ 370/203; 370/252; 455/63.1

(58) Field of Classification Search
USPC ................. 370/203, 208, 350, 503; 375/260; 455/63.1
See application file for complete search history.

(56) References Cited

U.S. PATENT DOCUMENTS

| | | | |
|---|---|---|---|
| 6,549,592 B1* | 4/2003 | Jones | 375/354 |
| 7,233,800 B2 | 6/2007 | Laroia et al. | |
| 7,355,959 B2* | 4/2008 | Molisch et al. | 370/208 |
| 7,623,579 B2* | 11/2009 | Masse et al. | 375/260 |
| 7,864,725 B2* | 1/2011 | Li et al. | 370/328 |
| 8,094,611 B2* | 1/2012 | Li et al. | 370/328 |
| 8,095,161 B2* | 1/2012 | Sandberg | 455/502 |
| 2004/0246925 A1* | 12/2004 | Wang | 370/332 |
| 2005/0254414 A1* | 11/2005 | Suda et al. | 370/203 |
| 2006/0087961 A1* | 4/2006 | Chang et al. | 370/203 |
| 2006/0239367 A1* | 10/2006 | Wilhelmsson et al. | 375/260 |
| 2007/0259693 A1* | 11/2007 | Brunel et al. | 455/561 |
| 2008/0146172 A1* | 6/2008 | Makhlouf et al. | 455/114.2 |
| 2009/0111385 A1 | 4/2009 | Choi et al. | |
| 2009/0111395 A1 | 4/2009 | Jiang et al. | |
| 2009/0221254 A1* | 9/2009 | Kawauchi et al. | 455/296 |
| 2010/0040178 A1* | 2/2010 | Sutton et al. | 375/345 |
| 2010/0054236 A1* | 3/2010 | Guvenc et al. | 370/350 |
| 2010/0157884 A1* | 6/2010 | Haga et al. | 370/328 |
| 2011/0087944 A1* | 4/2011 | Li et al. | 714/748 |

FOREIGN PATENT DOCUMENTS

| | | |
|---|---|---|
| JP | 03526991 A | 9/2003 |
| JP | 2010045546 A | 2/2010 |
| WO | 0167633 A1 | 9/2001 |
| WO | 2009016688 A1 | 2/2009 |

OTHER PUBLICATIONS

International Search Report and Written Opinion—PCT/US2010/046292—ISA/EPO—Nov. 25, 2010.
Taiwan Search Report—TW099128304—TIPO—May 22, 2013.

* cited by examiner

*Primary Examiner* — Warner Wong
(74) *Attorney, Agent, or Firm* — Kam T. Tam

(57) ABSTRACT

Certain aspects of the present disclosure relate to techniques and apparatus for detecting Orthogonal Frequency Division Multiplexing (OFDM) signals in the presence of frequency orthogonal OFDM interferers.

24 Claims, 5 Drawing Sheets

METHOD AND APPARATUS FOR DETECTING OFDM SIGNALS IN THE PRESENCE OF FREQUENCY ORTHOGONAL OFDM INTERFERERS

CLAIM OF PRIORITY UNDER 35 U.S.C. §119

The present application for patent claims benefit of U.S. Patent Application Ser. No. 61/236,495, entitled, "Method and Apparatus for Detecting OFDM Signals in the Presence of Frequency Orthogonal OFDM Interfers," filed Aug. 24, 2009, and assigned to the assignee hereof and hereby expressly incorporated by reference herein.

BACKGROUND

1. Field

Certain aspects of the present disclosure generally relate to wireless communications and, more particularly, to a method and apparatus for detecting Orthogonal Frequency Division Multiplexing (OFDM) signals in the presence of frequency orthogonal OFDM interferers.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3$^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes receiving a signal transmitted from a desired apparatus, wherein the received signal is potentially corrupted by transmissions from an interfering apparatus, synchronizing boundaries of a correlation window with boundaries of a symbol transmitted from the interfering apparatus, and correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

Certain aspects of the present disclosure provide an apparatus for wireless communications. The apparatus generally includes at least one processor, and a memory coupled to the at least one processor, wherein the at least one processor is configured to receive a signal transmitted from a desired apparatus, wherein the received signal is potentially corrupted by transmissions from an interfering apparatus, synchronize boundaries of a correlation window with boundaries of a symbol transmitted from the interfering apparatus, and correlate a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

Certain aspects of the present disclosure provide an apparatus for wireless communications. The apparatus generally includes means for receiving a signal transmitted from a desired apparatus, wherein the received signal is potentially corrupted by transmissions from an interfering apparatus, means for synchronizing boundaries of a correlation window with boundaries of a symbol transmitted from the interfering apparatus, and means for correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

Certain aspects of the present disclosure provide a computer program product. The computer program product generally includes a computer-readable medium comprising code for receiving a signal transmitted from a desired apparatus, wherein the received signal is potentially corrupted by transmissions from an interfering apparatus, synchronizing boundaries of a correlation window with boundaries of a symbol transmitted from the interfering apparatus, and correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
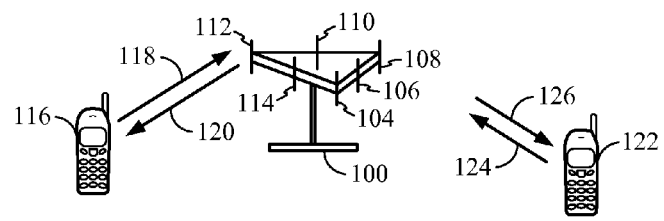
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is now an integral part of uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
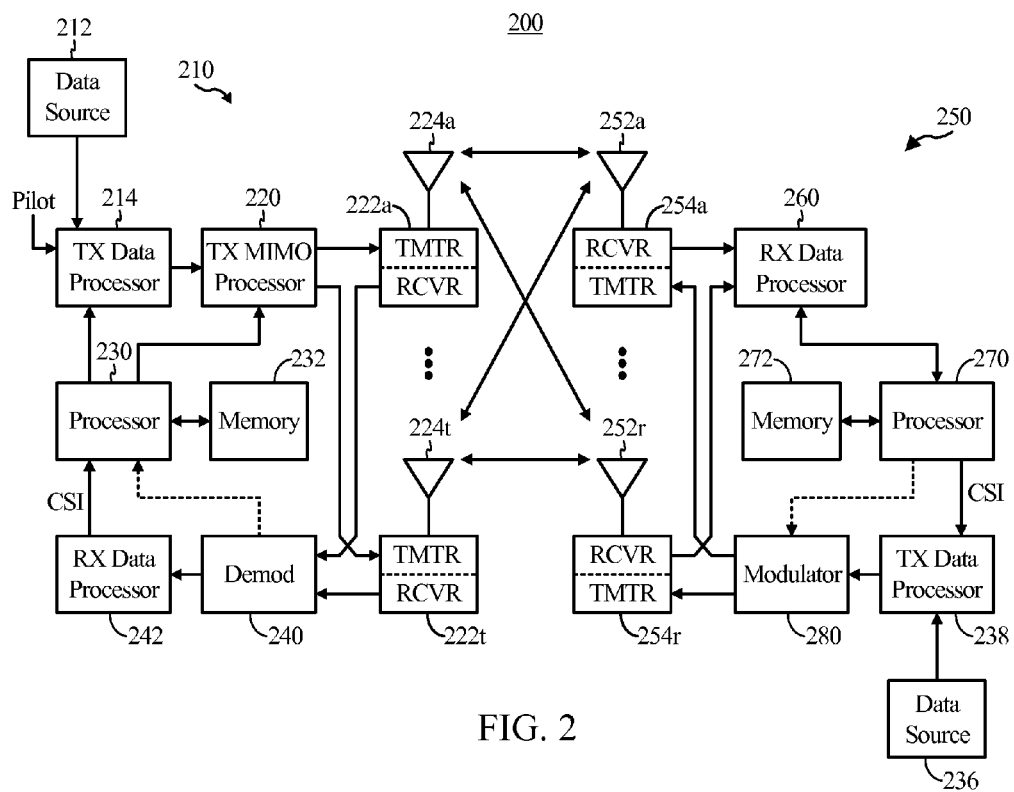
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using Orthogonal Frequency Division Multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
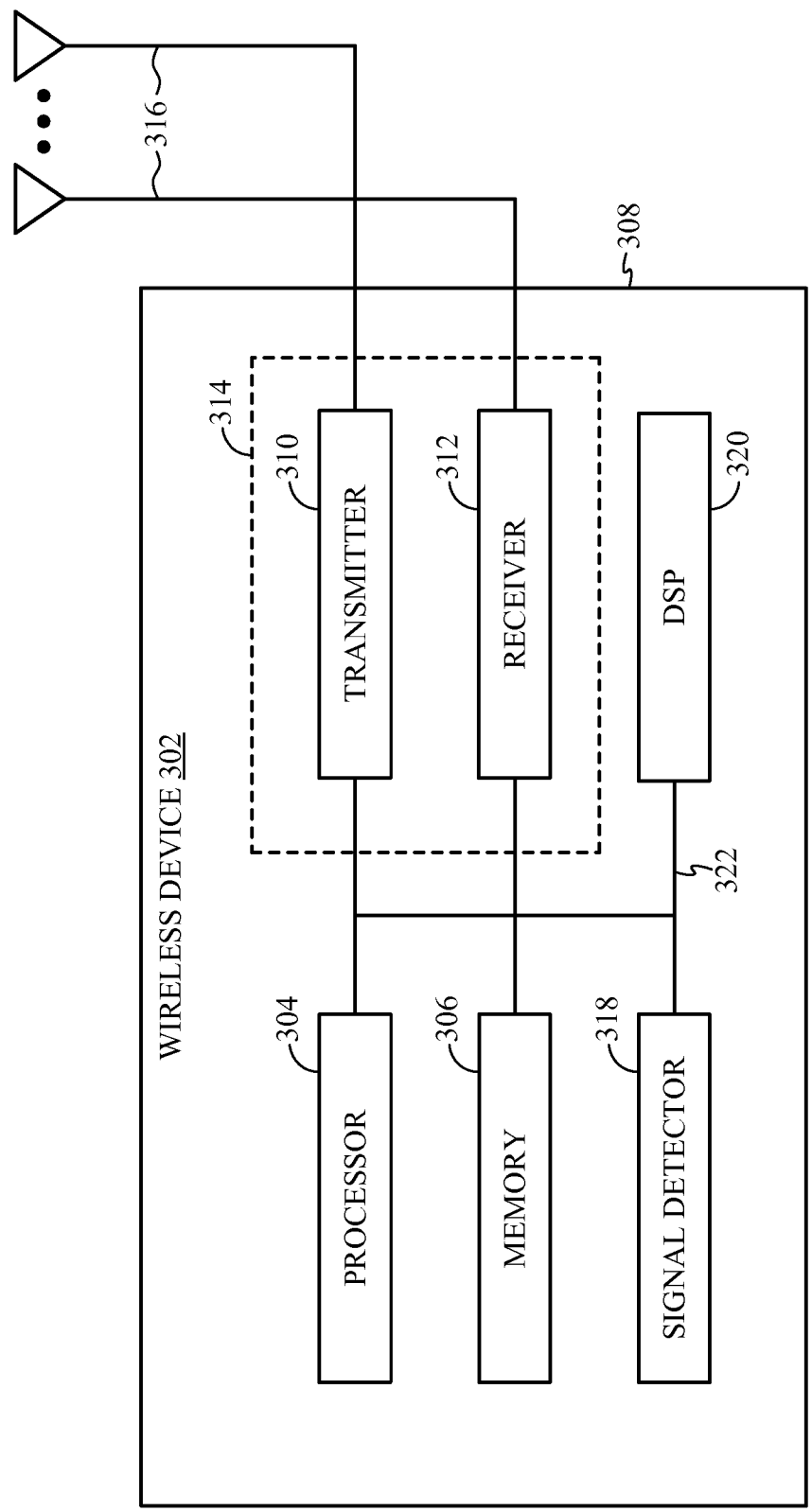
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH) and Broadband Pilot Channel (BPICH).

In an aspect, a channel structure is provided (at any given time, the channel is contiguous or uniformly spaced in frequency) that preserves low PAPR properties of a single carrier waveform.

Frequency domain orthogonality of OFDM signals transmitted from different transmitters (e.g., base stations) may be dependent on time synchronization at a receiver (e.g., a mobile station). If a time offset between two of the transmitted OFDM signals is greater than a cyclic prefix (CP), then frequency domain orthogonality between these OFDM signals may be lost. The loss of orthogonality may be even worsened in multi-path scenarios.

Certain aspects of the present disclosure enable mitigating to a great extent the problem of lost orthogonality between received OFDM signals that may originate from different transmitters. One possible application of methods proposed in the present disclosure may be in performing triangulation-based position/location estimation in OFDM systems, such as LTE systems.

Figure 4:
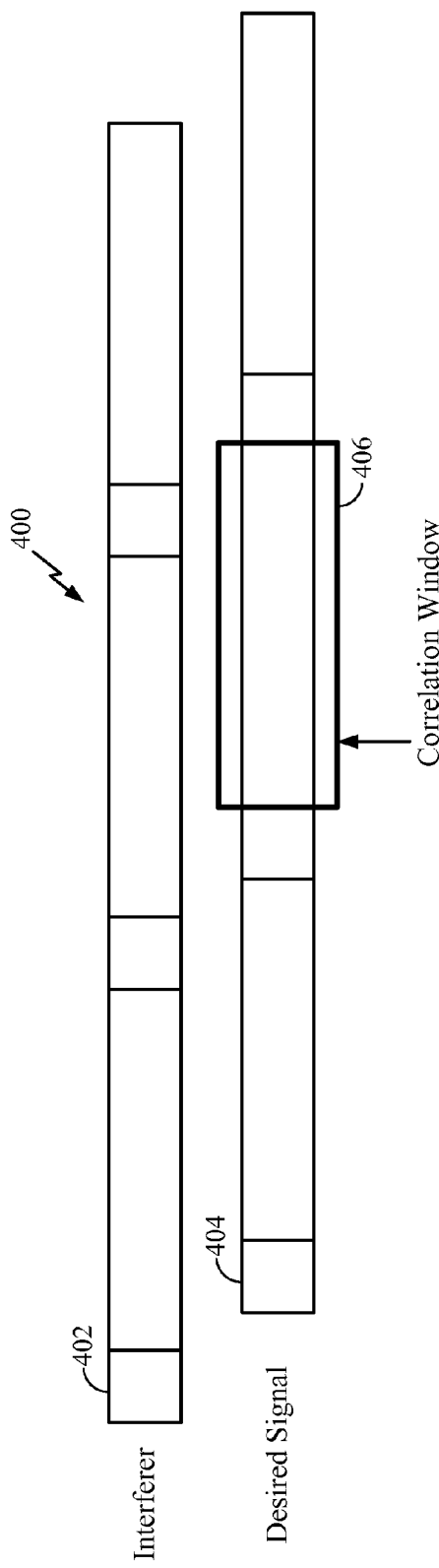
FIG. 4 illustrates a first example of detecting signals in the presence of frequency orthogonal interferers in accordance with certain aspects of the present disclosure.

Detection of OFDM Signals in the Presence of Frequency Orthogonal OFDM Interferers FIG. 4 illustrates an example 400 of detecting OFDM signals in the presence of orthogonal OFDM interferers in accordance with certain aspects of the present disclosure. An OFDM signal 404 comprising a signal to be detected may be correlated with an OFDM interferer 402 within a correlation window 406. The signal 404 may correspond to a signal received at a mobile station from a non-serving base station corrupted by the interferer 402, while the interferer 402 may correspond to a signal received at the mobile station from a serving base station. By detecting signals from interfering base stations and by knowing in advance position of the interfering base stations, it may be possible to perform triangulation-based estimation of a position/location of the mobile user.

The detection method illustrated in FIG. 4 is based on a conventional correlation that may maximize the processing gain for detecting a desired OFDM signal. However, the orthogonal interferer 402 may cause interference because of the loss in orthogonality due to a time offset between the interferer 402 and the signal 404. It should be noted that the correlation window 406 illustrated in FIG. 4 may not encompass an entire OFDM symbol of the interferer 402. Hence, there may be some leakage of interference despite the fact that a portion of the interferer 402 within the correlation window 406 may be orthogonal to the desired signal 404. An improved correlation method that may avoid the interference leakage is illustrated in FIG. 5.

Figure 5:
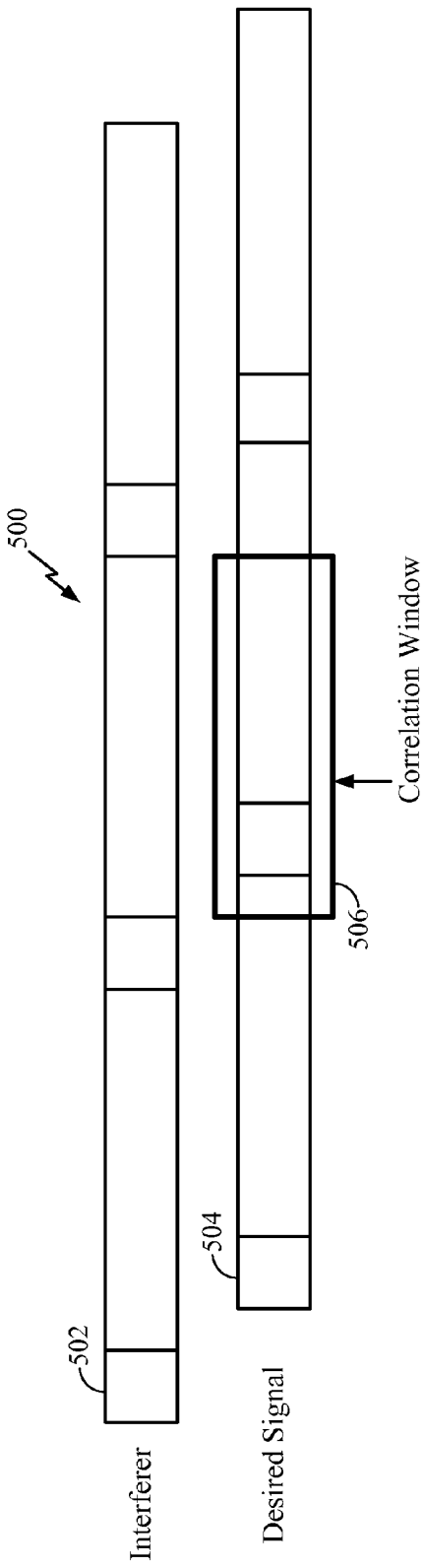
FIG. 5 illustrates a second example of detecting signals in the presence of frequency orthogonal interferers in accordance with certain aspects of the present disclosure.

FIG. 5 illustrates an example 500 of detecting OFDM signals in the presence of orthogonal OFDM interferers in accordance with certain aspects of the present disclosure. The cyclic correlation may be preformed within a correlation window 506 using an OFDM signal 504 transmitted from a non-serving base station and its cyclically shifted version. The correlation window 506 may be synchronized with an OFDM symbol of the interferer 502. In other words, a replica OFDM symbol of the desired signal 504 may be applied at a mobile receiver to perform cyclic correlation over the correlation window 506 with the OFDM symbol of the desired user. In this way, it may be possible to re-orthogonalize the interferer 502 relative to the desired signal 504 within the correlation window 506 synchronized with the OFDM symbol of the interferer 502.

Although the orthogonality between the interferer 502 and the desired signal 504 may be restored within the correlation window 506, there may be some slight loss in the correlation value. This loss may be due to a noise from a portion of the signal 504 within the correlation window 506 that do not coincide with an OFDM symbol of the desired signal. Further, the processing gain loss may be due to an unused OFDM symbol portion of the desired signal 504 that may be outside the correlation window 506.

The detection method illustrated in FIG. 5 may result in better overall output signal-to-noise ratio (SNR), especially when a power of the frequency orthogonal interferer signal is high. This method may also provide reduced computational complexity when the correlation is implemented using fast Fourier transforms (FFTs). Given that the same correlation window 506 may be utilized for correlation with different signals originating from different base stations, the FFT of the received signal may be required to be taken only once.

Figure 6:
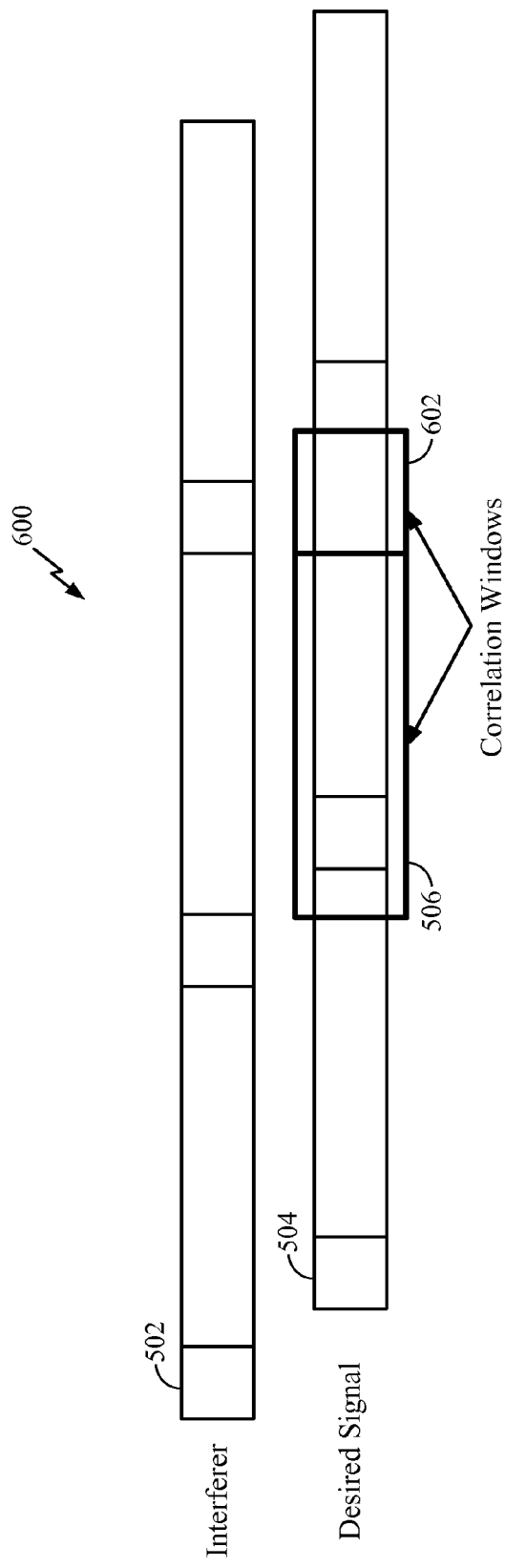
FIG. 6 illustrates a third example of detecting signals in the presence of frequency orthogonal interferers in accordance with certain aspects of the present disclosure.

Some processing gain that may be lost if the correlation method illustrated in FIG. 5 is used can be regained by employing an extended correlation window relative to the correlation window 506 from FIG. 5. FIG. 6 illustrates an example 600 of detecting OFDM signals in the presence of orthogonal OFDM interferers in accordance with certain aspects of the present disclosure. As illustrated in FIG. 6, the correlation window 506 may be extended with another adjacent correlation window 602 to achieve additional processing gain and to further improve correlation performance. In this case, an entire OFDM symbol of the desired signal 504 may be included within the correlation windows 506 and 602. This OFDM symbol may be then correlated with a frequency orthogonal OFDM symbol of the interferer 502 for detecting the desired signal 504.

Figure 7:
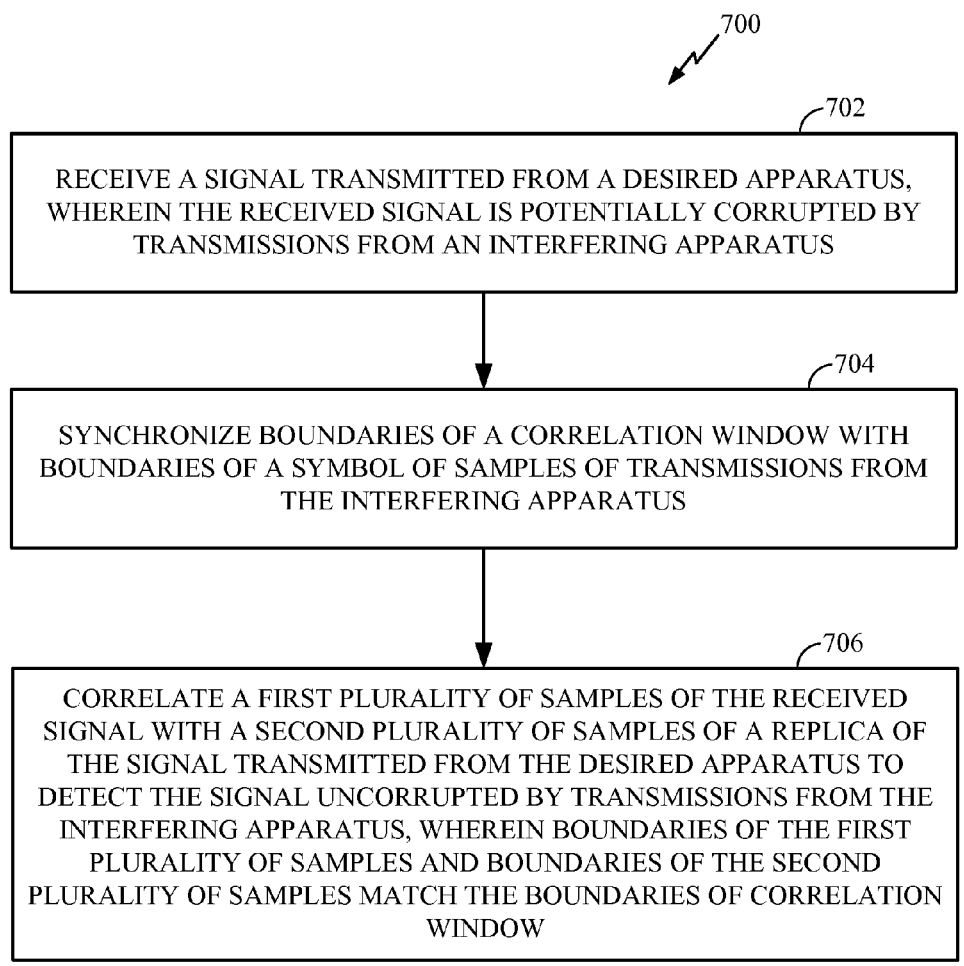
FIG. 7 is a functional block diagram conceptually illustrating example blocks that may be performed at an access terminal in accordance with certain aspects of the present disclosure.

FIG. 7 is a functional block diagram conceptually illustrating example blocks 700 executed at an access terminal (i.e., a wireless receiver) in accordance with certain aspects of the present disclosure. Operations illustrated by the blocks 700 may be executed, for example, at the processor(s) 260, and/or 270 of the access terminal 250 from FIG. 2.

The operations may begin, at block 702, by receiving a signal transmitted from a desired apparatus (e.g., from a non-serving base station), wherein the received signal may be corrupted by transmissions from an interfering apparatus (e.g., from a base station serving the access terminal). At block 704, the access terminal may synchronize boundaries of a correlation window with boundaries of a symbol transmitted from the interfering apparatus. At block 706, the access terminal may correlate a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples may match the boundaries of correlation window.

In one configuration, the apparatus 250 for wireless communication includes means for receiving a signal transmitted from a desired apparatus, wherein the received signal may be potentially corrupted by transmissions from an interfering apparatus, means for synchronizing boundaries of a correlation window with boundaries of a symbol transmitted from the interfering apparatus, and means for correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples may match the boundaries of correlation window. In one aspect, the aforementioned means may be the processors 260 and 270 configured to perform the functions recited by the aforementioned means. In another aspect, the aforementioned means may be a module or any apparatus configured to perform the functions recited by the aforementioned means.

Further, for the purpose of performing triangulation-based estimation of a position/location of the access terminal, the access terminal may receive another signal transmitted from another desired apparatus potentially corrupted by transmissions from the interfering apparatus. Then, the access terminal may correlate a third plurality of samples of the other signal with a fourth plurality of samples of a replica of the other signal transmitted from the other desired apparatus to detect the other signal uncorrupted by transmissions from the interfering apparatus, wherein boundaries of the third plurality of samples and boundaries of the fourth plurality of samples may match the boundaries of correlation window, and the signal and the other signal may be transmitted from different apparatuses other than the interfering apparatus.

The correlation window may be extended to comprise at least an OFDM symbol of the received signal. Then, a third plurality of samples of the received signal may be correlated with a fourth plurality of samples of the replica of signal transmitted from the desired apparatus to detect the signal uncorrupted by transmissions from the interfering apparatus, wherein boundaries of the third plurality of samples and boundaries of the fourth plurality of samples may match boundaries of the extended correlation window.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   receiving a signal transmitted from a desired apparatus, wherein the received signal is potentially corrupted by transmissions from an interfering apparatus;
   synchronizing boundaries of a correlation window with boundaries of a symbol transmitted from the interfering apparatus; and
   correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

2. The method of claim 1, wherein the symbol comprises an Orthogonal Frequency Division Multiplexing (OFDM) symbol.

3. The method of claim 1, wherein the second plurality of samples comprises at least a portion of a cyclically shifted version of an Orthogonal Frequency Division Multiplexing (OFDM) symbol.

4. The method of claim 1, further comprising:
   receiving another signal transmitted from another desired apparatus potentially corrupted by transmissions from the interfering apparatus; and
   correlating a third plurality of samples of the other signal with a fourth plurality of samples of a replica of the other signal transmitted from the other desired apparatus to detect the other signal uncorrupted by transmissions from the interfering apparatus, wherein
   boundaries of the third plurality of samples and boundaries of the fourth plurality of samples match the boundaries of correlation window, and
   the signal and the other signal were transmitted from different apparatuses other than the interfering apparatus.

5. The method of claim 4, wherein:
   samples of the first plurality are orthogonal in frequency domain to samples of the second plurality, and
   samples of the third plurality are orthogonal in frequency domain to samples of the fourth plurality.

6. The method of claim 1, further comprising:
   extending the correlation window, wherein the extended correlation window comprises at least an Orthogonal Frequency Division Multiplexing (OFDM) symbol of the received signal; and
   correlating a third plurality of samples of the received signal with a fourth plurality of samples of the replica of signal transmitted from the desired apparatus to detect the signal uncorrupted by transmissions from the interfering apparatus, wherein boundaries of the third plurality of samples and boundaries of the fourth plurality of samples match boundaries of the extended correlation window.

7. An apparatus for wireless communications, comprising:
   at least one processor; and
   a memory coupled to the at least one processor,
   wherein the at least one processor is configured to
      receive a signal transmitted from a desired apparatus, wherein the received signal is potentially corrupted by transmissions from an interfering apparatus,
      synchronize boundaries of a correlation window with boundaries of a symbol transmitted from the interfering apparatus, and correlate a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

8. The apparatus of claim 7, wherein the symbol comprises an Orthogonal Frequency Division Multiplexing (OFDM) symbol.

9. The apparatus of claim 7, wherein the second plurality of samples comprises at least a portion of a cyclically shifted version of an Orthogonal Frequency Division Multiplexing (OFDM) symbol.

10. The apparatus of claim 7, wherein the at least one processor is also configured to:
receive another signal transmitted from another desired apparatus potentially corrupted by transmissions from the interfering apparatus,
correlate a third plurality of samples of the other signal with a fourth plurality of samples of a replica of the other signal transmitted from the other desired apparatus to detect the other signal uncorrupted by transmissions from the interfering apparatus, and wherein
boundaries of the third plurality of samples and boundaries of the fourth plurality of samples match the boundaries of correlation window, and
the signal and the other signal were transmitted from different apparatuses other than the interfering apparatus.

11. The apparatus of claim 10, wherein:
samples of the first plurality are orthogonal in frequency domain to samples of the second plurality, and
samples of the third plurality are orthogonal in frequency domain to samples of the fourth plurality.

12. The apparatus of claim 7, wherein the at least one processor is also configured to:
extend the correlation window, wherein the extended correlation window comprises at least an Orthogonal Frequency Division Multiplexing (OFDM) symbol of the received signal, and
correlate a third plurality of samples of the received signal with a fourth plurality of samples of the replica of signal transmitted from the desired apparatus to detect the signal uncorrupted by transmissions from the interfering apparatus, wherein boundaries of the third plurality of samples and boundaries of the fourth plurality of samples match boundaries of the extended correlation window.

13. An apparatus for wireless communications, comprising:
means for receiving a signal transmitted from a desired apparatus, wherein the received signal is potentially corrupted by transmissions from an interfering apparatus;
means for synchronizing boundaries of a correlation window with boundaries of a symbol transmitted from the interfering apparatus; and
means for correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

14. The apparatus of claim 13, wherein the symbol comprises an Orthogonal Frequency Division Multiplexing (OFDM) symbol.

15. The apparatus of claim 13, wherein the second plurality of samples comprises at least a portion of a cyclically shifted version of an Orthogonal Frequency Division Multiplexing (OFDM) symbol.

16. The apparatus of claim 13, further comprising:
means for receiving another signal transmitted from another desired apparatus potentially corrupted by transmissions from the interfering apparatus; and
means for correlating a third plurality of samples of the other signal with a fourth plurality of samples of a replica of the other signal transmitted from the other desired apparatus to detect the other signal uncorrupted by transmissions from the interfering apparatus, wherein
boundaries of the third plurality of samples and boundaries of the fourth plurality of samples match the boundaries of correlation window, and
the signal and the other signal were transmitted from different apparatuses other than the interfering apparatus.

17. The apparatus of claim 16, wherein:
samples of the first plurality are orthogonal in frequency domain to samples of the second plurality, and
samples of the third plurality are orthogonal in frequency domain to samples of the fourth plurality.

18. The apparatus of claim 13, further comprising:
means for extending the correlation window, wherein the extended correlation window comprises at least an Orthogonal Frequency Division Multiplexing (OFDM) symbol of the received signal; and
means for correlating a third plurality of samples of the received signal with a fourth plurality of samples of the replica of signal transmitted from the desired apparatus to detect the signal uncorrupted by transmissions from the interfering apparatus, wherein boundaries of the third plurality of samples and boundaries of the fourth plurality of samples match boundaries of the extended correlation window.

19. A non-transitory computer program product, comprising a computer-readable medium comprising code for:
receiving a signal transmitted from a desired apparatus, wherein the received signal is potentially corrupted by transmissions from an interfering apparatus;
synchronizing boundaries of a correlation window with boundaries of a symbol transmitted from the interfering apparatus; and
correlating a first plurality of samples of the received signal with a second plurality of samples of a replica of the signal transmitted from the desired apparatus to detect the signal uncorrupted by transmissions from the interfering apparatus, wherein boundaries of the first plurality of samples and boundaries of the second plurality of samples match the boundaries of correlation window.

20. The computer program product of claim 19, wherein the symbol comprises an Orthogonal Frequency Division Multiplexing (OFDM) symbol.

21. The computer program product of claim 19, wherein the second plurality of samples comprises at least a portion of a cyclically shifted version of an Orthogonal Frequency Division Multiplexing (OFDM) symbol.

22. The computer program product of claim 19, wherein the computer-readable medium further comprising code for:
receiving another signal transmitted from another desired apparatus potentially corrupted by transmissions from the interfering apparatus; and correlating a third plurality of samples of the other signal with a fourth plurality of samples of a replica of the other signal transmitted from the other desired apparatus to detect the other signal uncorrupted by transmissions from the interfering apparatus, and wherein boundaries of the third plurality of samples and boundaries of the fourth plurality of samples match the boundaries of correlation window, and the signal and the other signal were transmitted from different apparatuses other than the interfering apparatus.

23. The computer program product of claim 22, wherein:
samples of the first plurality are orthogonal in frequency domain to samples of the second plurality, and
samples of the third plurality are orthogonal in frequency domain to samples of the fourth plurality.

24. The computer program product of claim 19, wherein the computer-readable medium further comprising code for:
extending the correlation window, wherein the extended correlation window comprises at least an Orthogonal Frequency Division Multiplexing (OFDM) symbol of the received signal; and
correlating a third plurality of samples of the received signal with a fourth plurality of samples of the replica of signal transmitted from the desired apparatus to detect the signal uncorrupted by transmissions from the interfering apparatus, wherein boundaries of the third plurality of samples and boundaries of the fourth plurality of samples match boundaries of the extended correlation window.

* * * * *